UNITED STATES PATENT OFFICE.

JOSEPH VAN RUYMBEKE, OF CHICAGO, ILLINOIS, ASSIGNOR OF ONE-HALF TO WILLIAM F. JOBBINS, OF SAME PLACE.

PROCESS OF OBTAINING GLYCERINE FROM SOAP-MAKERS' WASTE.

SPECIFICATION forming part of Letters Patent No. 458,647, dated September 1, 1891.

Application filed December 20, 1890. Serial No. 375,288. (No specimens.)

*To all whom it may concern:*

Be it known that I, JOSEPH VAN RUYMBEKE, a subject of the King of Belgium, residing at Chicago, in the county of Cook and State of Illinois, have invented a certain new and useful Improvement in Processes of Obtaining Glycerine from Soap-Makers' Waste, which is fully set forth in the following specification.

In the manufacture of soaps a large proportion of the glycerine contained in the oils and fats employed passes into the salty lye which is left at the end of the operation.

The object of my present invention is to recover from this waste product glycerine in a sufficiently pure condition for commercial purposes or for use without further treatment.

The invention consists in first treating the lye with an acid to partially neutralize the free alkali of the solution and then adding sulphate of iron or sulphate of aluminum to complete the said neutralization, then filtering or otherwise separating out the precipitate, then evaporating to crystallize out the salt, and finally distilling the resulting liquid to obtain the glycerine.

I will proceed to describe more in detail the process whereby I obtain the result mentioned above. I first treat any convenient quantity of the waste product or salty lye mentioned above with an acid to partially neutralize the free alkali of the solution. Muriatic acid I prefer for this purpose, but do not wish to be understood as limiting my process to the use of this particular acid; and I prefer to use about seventy-five per cent. of the quantity of acid required to entirely neutralize the free alkali of the lye. This quantity of acid will be determined by test in every instance, for the percentage of free alkali in the solution will vary greatly at different factories and under different processes for making soap. The quantity of free alkali being determined by suitable test, the quantity of acid required to neutralize it will of course, be readily determined, and about seventy-five per cent. of this quantity is to be added to the liquid and thoroughly mixed therewith. I then add to the liquid sulphate of iron or sulphate of aluminum in sufficient quantity to entirely complete the said neutralization. The quantity of salt added must be sufficient to entirely complete this neutralization, and any slight excess will not be detrimental, as it is entirely removed in the subsequent treatment of the liquid by filtration, as will be presently described. The effect of this treatment with the sulphate is to form a precipitate consisting of resinous matter, fatty acids, insoluble soaps of iron or aluminum, some hydrate of iron or aluminum, and sometimes, also, albuminous matter, all of which are sufficiently solid to permit the use of a filter-press for their removal. The next step is to separate this precipitate from the solution. This I accomplish in any suitable way, either by filtration or by decantation. I prefer filtration, however, with a suitable filter-press, as much more speedy. As stated above, the precipitate formed by the neutralizing process already described is sufficiently solid to permit of separation by the use of a filter-press. If any slight excess of the sulphates remains it is also in the form of a precipitate and will be entirely removed with the other substances. The liquid obtained by this separation will be a clarified solution of glycerine and the salts employed in soap-making, though sometimes slight impurities may be left. This clarified solution is then evaporated to separate out the salts, as far as possible, by crystallization and concentrate the salty solution of crude glycerine. This step will entirely complete the clarification of the liquid, for the slight impurities sometimes remaining, as mentioned above, will be separated out with the crystallization of the salt. To accomplish this crystallization, the liquid as it comes from the filter process is run into a tank provided with steam-coils, which are placed at some distance above the bottom, in which it is boiled until evaporated to the consistency required for the distillation hereinafter explained. As this concentration progresses the salt will crystallize and settle at the bottom of the tank in the space below the coils, and the liquid may be readily drawn off above this space, after which the salty sirupy mass remaining in the bottom of the tank is easily removed and is preferably submitted to the action of a centrifugal filter, whereby the crystallized salt is separated from the remaining glycerine in a sufficiently pure condition to be again used in the manufacture of soap. The liquid obtained by this operation is a saturated solution of salt in glycerine and is in condition for distillation. During the process of removing the salt by crystallization the heat of the liquor is gradually increased as it becomes more dense during the process of evaporation. If the liquid is evaporated in the open air, this will furnish a test for the continuation of the process. It should be continued until the temperature rises to about 290° Fahrenheit, or a little over. If, however, the evaporation is effected in vacuum, the heat test cannot be depended upon; but the solution must be tested from time to time to determine its density, which is then the guide for determining the completion of the operation of crystallization. The resultant is a clear sirupy liquid which is a nearly pure solution of salt in glycerine. This liquid is allowed to cool, so as to allow the sulphate of soda contained therein to crystallize, which result will not be effected while the liquid is hot. After being separated in any suitable way from the crystallized sulphate of soda the syrup is distilled in vacuum and there results from this distillation a glycerine which upon concentration is ready for the market and sufficiently pure for ordinary use without further treatment. If any slight organic impurities and common salt may be contained in the syrup before distillation, they will be left in the still, so that the glycerine recovered will be merchantably pure. It will be seen in this process that the impurities in the waste soap-lye, except the common salt, are at once precipitated and mostly removed from the liquor, thus leaving a comparatively pure solution of glycerine and salt. The remaining impurities, if any, are practically removed with the crystallizing out of the salt. As the salt thus recovered is intended to be used over again in the manufacture of soap, the slight impurities which may be removed with it are of no consequence. The result of the entire treatment of the liquid before distillation is, as will be seen, a practically pure saturated solution of common salt in glycerine, so that nothing further is necessary to be done but distil out the glycerine from the solution. This distillation I effect in a special way. The solution is placed in a still of any suitable form, which is connected with suitable devices for producing and maintaining a high vacuum within the still. The still is heated with common or saturated steam, either by means of a coil within the still, steam-jacket around the outside thereof, or any other ordinary way. Free steam required for distillation is injected into and through the heated liquor within the still, as usual; but this steam in my process must be common or saturated steam. The steam both for the heating device and for injection may be taken from the same source of supply, if desired. The object is to avoid the use of superheated steam, especially the steam which is injected directly into the liquid. I have found that under a high vacuum it is possible to successfully distil glycerine and other fatty substances with common or saturated steam only at a temperature not materially above 300° Fahrenheit, which is my limit in this process. The result of this distillation is a substantially pure glycerine, the salt, of course being left in the still; but ordinarily it will not be sufficiently concentrated for commercial purposes. It is only necessary then to concentrate this product of the still by any ordinary method of evaporation. Evaporating-pans such as are ordinarily used for concentrating liquids are suitable for this purpose, and upon bringing the liquid to the proper degree of concentration the glycerine is ready for the market. I am aware that soap-makers' waste or spent lye has been heretofore treated for the purpose of obtaining glycerine therefrom. I am also aware that acids and metallic salts, either alone or in certain combinations, have been used heretofore for the purpose of obtaining crude glycerine from this waste material. I am also aware that patents have heretofore been granted for some of these processes, among which I mention Letters Patent No. 413,619 to Domeier and Hagemann, dated October 22, 1889. I hereby distinctly disclaim the process set forth and claimed in the said Letters Patent No. 413,619. In these prior processes, so far as I know, it is the practice to completely neutralize the free alkali of the spent lye with acids. Metallic salts are added either before or after the acid treatment for action upon the soapy or fatty material in the lye. In the complete neutralization of the free alkali of the lye by acid there is always danger of an excess of acid remaining in the solution, the presence of which will seriously interfere with the subsequent treatment of the liquid for the recovery of the glycerine. Some further operation will be required to neutralize this remaining acid. In this method it is also necessary to supplement the use of the metallic salts by treatment with lime or metallic oxide, or both. In these prior processes, so far as I know, the precipitate is always of a gelatinous and slimy nature, which, while separable from the liquid crude glycerine by settling, is not sufficiently hard to allow the use of a filter-press. The precipitate is so soft that more or less of it would be forced through the press with the liquid.

In processes heretofore employed, whenever there has been any attempt to distil the glycerine from the crude liquor it has been with the application of superheated steam or fire and superheated steam and, so far as I am aware, without vacuum. This use of fire and superheated steam is attended, however, with great danger of burning the glycerine, and so the success of the operation is always a matter of great uncertainty.

There are the following differences between my process described above and prior processes referred to. Instead of entirely neutralizing the free alkali with acids, I only partially neutralize with acid and then complete the neutralization of the free alkali by the addition of metallic salts. The separation of the crude glycerine from the precipitate is effected by a filter-press. The crude glycerine is separated from the solution of salt in glycerine by distillation with common or saturated steam under a high vacuum. These differences result in the following advantages: By my method of neutralizing the free alkali of the lye I entirely obviate the danger of the presence of acid or metallic salts in the clarified solution. There will be no acid, because only a portion of the amount required for neutralization being used it will, of course, be entirely taken up. There will be no metallic salts, because in my method of finishing the neutralization of the free alkali by adding metallic salts there results a double decomposition, metallic insoluble soaps being formed and the mineral acid thus freed combining at once with the soda contained in the soaps decomposed, while the unneutralized free alkali will unite with the acid of the metallic salts to produce mineral salts of soda and metallic hydroxides. Now, all of these substances are insoluble, and hence may be entirely separated from the liquid. Furthermore, these substances form a precipitate which is sufficiently hard and firm to permit the use of a filter-press in effecting this separation. The metallic salts are therefore entirely removed from the liquid, because they are entirely taken up in forming the precipitates mentioned above, which may be entirely separated from the liquid. Furthermore, this separation may be effected by a filter-press, which effects a great saving of time, a very important matter in a commercial process, and also effects a saving of liquor, because the sediment in separation by the settling process, being soft and bulky, retains considerable of the liquid, which it is almost impossible to recover by washing. With the filter-press in my process, however, a solid cake is left which contains only a small percentage of liquor, and even this may be readily removed by washing in the press. In the process of distillation I avoid all danger of burning the glycerine, for the temperature of saturated steam is very constant and easily maintained at about 300° Fahrenheit, which is not sufficient to injure the glycerine in any way, and in no case in my process should the temperature be carried materially above 300° Fahrenheit, which temperature I make the definite limit in the practice of my process so far as the distillation is concerned. The successful use of saturated steam for this distillation is, however, dependent entirely upon carrying on the process under vacuum, and a very high vacuum at that. I have found that a vacuum of twenty-eight inches or more is absolutely necessary to this process, and I limit my improvement to this very high vacuum.

I am aware that heretofore glycerine has been distilled with superheated steam and under vacuum; but I believe I am absolutely the first to successfully distill glycerine at the low temperature of 300° Fahrenheit. In fact, in the very latest text-books of which I have any knowledge, it is stated that glycerine distills under vacuum at 350° Fahrenheit and not lower.

Of course in the practice of my process slight immaterial variations in the degree of vacuum and in the temperature will occur, so that I do not mean to be understood as fixing the limit of vacuum at exactly twenty-eight inches or of temperature at exactly 300° Fahrenheit; but the vacuum cannot be materially lower nor the temperature materially higher than the limits named above.

It will be noted that I here provide a complete process for the production of commercial glycerine from spent lye. The object of my invention is not to obtain crude glycerine simply, but the finished article ready for the trade, and the latter part of my process may be applied to the purification of crude glycerine obtained by some method other than that which I have described above.

Having thus described my invention, what I claim as new, and desire to secure by Letters Patent, is—

1. The herein-described process for obtaining glycerine from waste soap-lye, the same consisting in first partially neutralizing the free alkali of the lye by the addition of an acid, then adding metallic salts in sufficient quantity to complete the said neutralization, then separating the liquid from the precipitate, then placing the solution in a still and maintaining therein a high vacuum, and finally heating the still and injecting common or saturated steam into and through the liquid therein, substantially as described.

2. The herein-described process for the recovery of glycerine from waste soap-lye, the same consisting in first partially neutralizing the free alkali of the lye with an acid, then completing the said neutralization by the addition of sulphate of iron or sulphate of aluminum in sufficient quantity for this purpose, then separating the liquid from the precipitate by passing through a filter-press, then evaporating the liquid to crystallize out the salt, and then distilling off the glycerine from the salt solution in a still under a high vacuum heated with common or saturated steam and with common or saturated steam injected into and through the liquid, substantially as described.

3. In a process for the recovery of glycerine from waste soap-lye, the herein-described method of distilling crude glycerine, the same consisting in placing the solution in a still and maintaining therein a high vacuum of at least twenty-eight inches, heating the still with common or saturated steam, and injecting common or saturated steam at a temperature of 300° Fahrenheit into and through the liquid therein, substantially as described.

JOSEPH VAN RUYMBEKE.

Witnesses:
CARRIE FEIGEL,
A. M. BEST.